US012601857B2

(12) United States Patent
Leskosek

(10) Patent No.: US 12,601,857 B2
(45) Date of Patent: Apr. 14, 2026

(54) METAMATERIAL DEVICES FOR OPTICAL ABSORPTION, DISPERSION AND DIRECTIONAL SENSING

(71) Applicant: James Andrew Leskosek, Summerland (CA)

(72) Inventor: James Andrew Leskosek, Summerland (CA)

( * ) Notice: Subject to any disclaimer, the term of this patent is extended or adjusted under 35 U.S.C. 154(b) by 636 days.

(21) Appl. No.: 17/727,023

(22) Filed: Apr. 22, 2022

(65) Prior Publication Data

US 2022/0342119 A1 Oct. 27, 2022

Related U.S. Application Data

(60) Provisional application No. 63/178,976, filed on Apr. 23, 2021.

(51) Int. Cl.
*G02B 1/00* (2006.01)
*G02B 5/00* (2006.01)
*G02B 5/04* (2006.01)

(52) U.S. Cl.
CPC ............. *G02B 1/002* (2013.01); *G02B 5/003* (2013.01); *G02B 5/04* (2013.01)

(58) Field of Classification Search
CPC ................ H01Q 15/0086; G02B 1/002; G02B 2207/101; G02B 5/1809; G02B 1/007; G02B 5/003; G02B 5/04; B82Y 20/00; G02F 2202/30
See application file for complete search history.

(56) References Cited

U.S. PATENT DOCUMENTS

| | | | |
|---|---|---|---|
| 2016/0054238 A1* | 2/2016 | Vaillon | G01Q 60/22 |
| | | | 324/637 |
| 2017/0066932 A1* | 3/2017 | Magdassi | C03C 17/32 |
| 2017/0329127 A1* | 11/2017 | Liu | G01N 21/3581 |
| 2020/0344430 A1* | 10/2020 | Wang | H04N 25/571 |
| 2021/0143555 A1* | 5/2021 | Akselrod | H01Q 15/0053 |
| 2021/0286188 A1* | 9/2021 | Rubin | G02B 27/283 |

(Continued)

FOREIGN PATENT DOCUMENTS

CN 110661107 A * 1/2020

OTHER PUBLICATIONS

Machine translation of CN-110661107-A (Year: 2020).*

(Continued)

*Primary Examiner* — Matthew Y Lee
(74) *Attorney, Agent, or Firm* — Spencer Fane, LLP

(57) ABSTRACT

Metamaterial devices for optical absorption, dispersion and directional sensing include optically transparent prisms made of a wide range optically transparent material, the prisms comprising a lens surface that is exposed to a source of electromagnetic radiation, with the other surfaces of the prism adjacent to a sensing device, a reflective surface and/or an optical absorption surface. Absorption devices are configured to trap and absorb the electromagnetic radiation that enters the lens surface. Dispersion devices are configured to scatter the electromagnetic radiation that enters the lens surface and the infrared radiation that radiates from an object and through the prism towards the lens surface. The directional sensing devices are configured to selectively detect electromagnetic radiation entering the device at a target angle.

14 Claims, 6 Drawing Sheets

(56) References Cited

U.S. PATENT DOCUMENTS

| | | | | |
|---|---|---|---|---|
| 2021/0375961 | A1* | 12/2021 | Wu | G06F 30/398 |
| 2022/0336509 | A1* | 10/2022 | Zhang | H10F 39/011 |

OTHER PUBLICATIONS

National Institute of Information and Communciations Technology, "Superconducting Nanowire Single-photon Detector (SSPD) with System Detection Efficiency over 80% at 1,550 nm Wavelength", Press Release, Nov. 5, 2013, 3 pages, Retrieved from <https://www.nict.go.jp/en/press/2013/11/05-1.html>.

Askari, M et al., "Infrared metamaterial refractive-index-based sensor", Journal of the Optical Society of America B, Aug. 18, 2020, pp. 2712-2718, vol. 37, Issue 9.

Shih, Kailing et al., "Nanofluidic terahertz metasensor for sensing in aqueous environment", Applied Physics Letters, Aug. 17, 2018, pp. 1-5, vol. 113.

Lee, Yohan et al., "Metamaterials and Metasurfaces for Sensor Applications", Sensors, Jul. 27, 2017, p. 1-28, vol. 17, Issue 8, MDPI, Basel, Switzerland.

Bytronic Vision Automation, "New technology: metamaterials and vision systems", Jan. 21, 2013, Retrieved from: <https://bytronic.com/news/new-technology-metamaterials-and-vision-systems/>.

Berger, Michael, "What are metamaterials?", archived on Apr. 1, 2019, Retrieved via Wayback machine on Jun. 22, 2022, Retrieved from <https://web.archive.org/web/20190401033708/https://www.nanowerk.com/what-are-metamaterials.php#expand>.

Manufacturing Group, "IBC Advanced Alloys delivers first F-35 EOTS components", Aerospace Manufacturing and Design, IBC Advanced Alloys Corp., Jul. 14, 2015, Retrieved from <https://www.aerospacemanufacturinganddesign.com/article/ibc-advanced-alloys-f35-eots-071415/>.

Lockheed Martin, "F-35 Lightning II Electro-Optical Targeting System (EOTS)", Sep. 2020, Retrieved from <https://www.lockheedmartin.com/en-us/products/f-35-lightning-ii-eots.html>.

Xie, Xin et al., "Analytical and experimental research on transmission backlash in precise cable drive for an electro-optical targeting system", Advances in Mechanical Engineering, Jul. 1, 2019, pp. 1-12, vol. 11, Issue 7, Sage Publications.

Wikipedia Contributors, "Forward-looking infrared", Apr. 18, 2021, Retrieved from Wikipedia, The Free Encyclopedia on Jun. 22, 2022, Retrieved from <https://en.wikipedia.org/w/index.php?title=Forward-looking_infrared&oldid=1018478480>.

Wikipedia Contributors, "Stealth technology", Mar. 20, 2021, Retrieved from Wikipedia, The Free Encyclopedia on Jun. 22, 2022, Retrieved from <https://en.wikipedia.org/w/index.php?title=Stealth_technology&oldid=1013133147>.

Wikipedia Contributors, "Infrared countermeasure", Apr. 4, 2021, Retrieved from Wikipedia, The Free Encyclopedia on Jun. 22, 2022, Retrieved from <https://en.wikipedia.org/w/index.php?title=Infrared_countermeasure&oldid=1015952636>.

\* cited by examiner

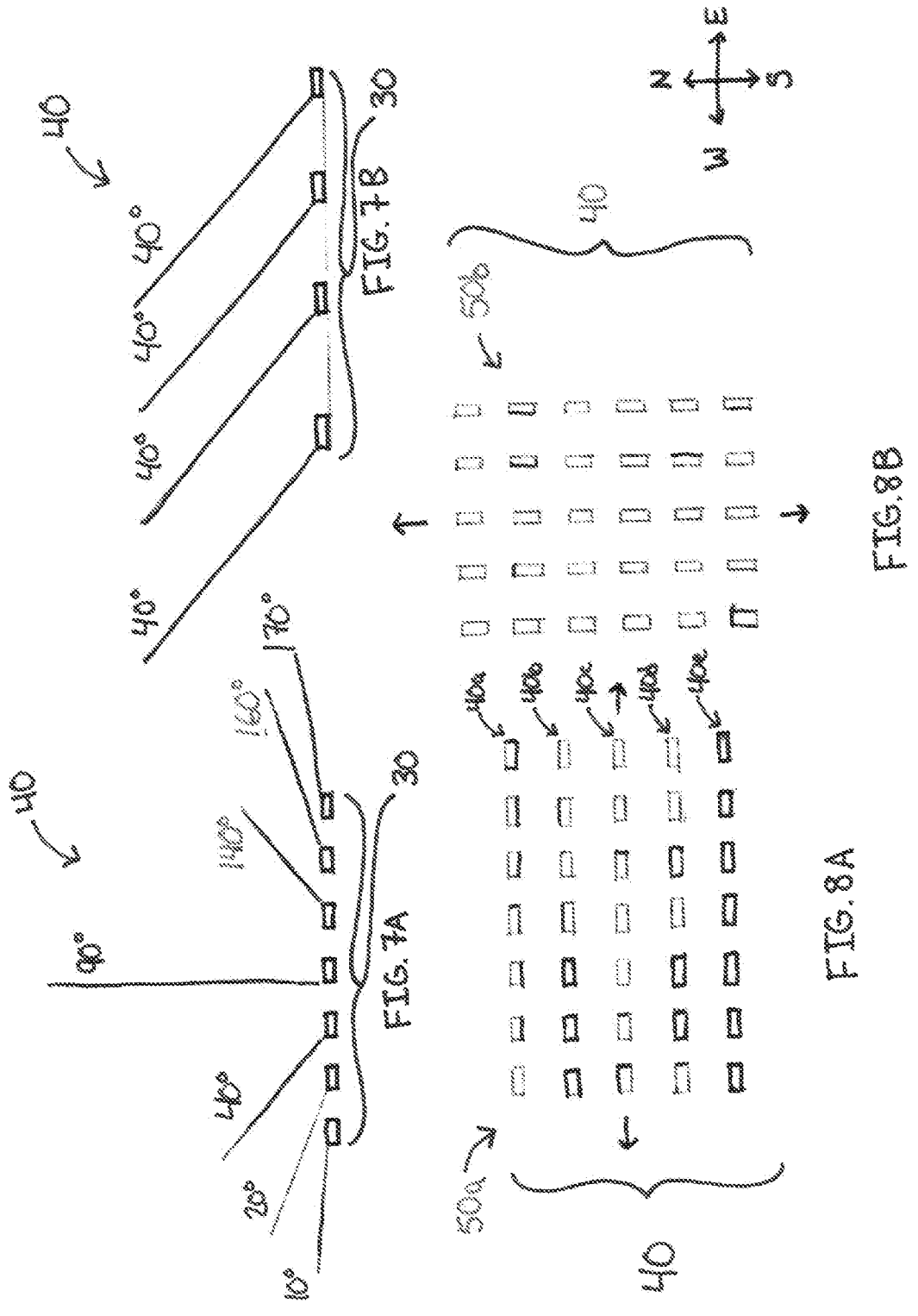

METAMATERIAL DEVICES FOR OPTICAL ABSORPTION, DISPERSION AND DIRECTIONAL SENSING

CROSS-REFERENCE TO RELATED APPLICATION

This application claims the benefit of U.S. Provisional patent application No. 63/178,976, filed on Apr. 23, 2021 and entitled "Next Generation Electro-Optical Sensor System," which is incorporated herein by reference.

FIELD

The present disclosure relates to the use of metamaterials in devices for sensing, absorbing and/or dispersing electromagnetic radiation across different ranges of the electromagnetic spectrum; in particular, the present disclosure relates to metamaterial devices for optical absorption, optical dispersion and directional optical sensing applications.

BACKGROUND

The navigational systems on aircraft utilize cameras and optical sensors, for detecting electromagnetic signatures of other objects in the airspace surrounding the aircraft, and/or objects on the land or in the water beneath the aircraft. Such navigational systems require the cameras and optical sensors to be mounted on and controlled by gimbals, so as to aim the sensors and cameras at the objects or a desired area to be viewed, as well as to steady the cameras and sensors. However, such gimbal supports are costly, require systems for controlling the gimbals and may be difficult to maintain. Such gimbal supports may also become frozen and unable to move in a desired direction, when two of the gimbal's axes become aligned during movement.

In addition to aircraft navigation systems, gimbals are also used in other contexts for the support and movement of cameras or optical sensors. An example includes the entertainment industry, whereby cameras have a defined field of view based on the shape and size of their lens. When the scene being filmed is outside the camera's field of view, it is necessary to move the camera so as to maintain the desired scene within the field of view of the camera. The limitations posed by a camera's field of view are also encountered, for example, in the use of security cameras for monitoring an area, whereby it may be necessary to re-position a security camera, using a motorized camera mount, to ensure that a person or object of interest remains within the camera's field of view.

Military aircraft may be detected by enemy forces, using sensors that detect electromagnetic radiation emitted by the aircraft. For example, an aircraft emits electromagnetic radiation in the visible, infrared and ultraviolet regions of the electromagnetic spectrum. Additionally, an aircraft may be detected by radar or other devices which detect the aircraft by emitting radiowaves or microwaves and detecting the reflection of those emissions off of the aircraft. Advanced thermal insulation systems may be used on aircraft to reduce the infrared radiation emitted by the aircraft, while coatings may be used on the outer surface of the aircraft to either reflect or absorb electromagnetic radiation. However, thermal insulation systems are limited in that they may only trap infrared radiation for a period of time before it transmits through the insulation, at which point the infrared signature of the aircraft is detectable. Outer coatings for absorbing or reflecting electromagnetic radiation are only capable of partially absorbing or reflecting electromagnetic radiation, and/or they may not be effective at absorbing or reflecting electromagnetic radiation across the electromagnetic spectrum. Furthermore, such outer coatings allow infrared radiation generated by the aircraft to be detected on the aircraft's surface as the aircraft moves through airspace. Attempts to disguise or obscure the heat generated by, for example, the engine of the aircraft include covering the body of the aircraft proximate the engine with insulation; however, the infrared radiation eventually migrates through the insulation and is still detectable by infrared cameras.

Different types of optical sensing devices, including but not limited to photodiodes, photoelectric cells, phototransistors and photoresistors, may not be capable of detecting electromagnetic radiation that falls below an intensity or sensitivity specification for that sensing device. Thus, known optical sensing devices may not be able to detect all electromagnetic radiation in a given range of the electromagnetic spectrum if a given electromagnetic wave is too weak or faint for the sensing device to detect it.

SUMMARY

The Applicant has discovered metamaterial structures that are useful in the creation of devices for the dispersion, absorption or directional sensing of electromagnetic radiation, across, for example, the ultraviolet, visible and infrared regions of the electromagnetic spectrum. Such metamaterials and devices made of these metamaterials may be useful in a variety of applications, including but not limited to the absorption or dispersion of electromagnetic radiation to obscure an object covered or coated in such metamaterials from detection. In other applications, metamaterial optical absorption devices may be configured to amplify the signal of a weak electromagnetic wave that enters the absorption device, allowing an optical sensing device to detect the amplified signal.

Regarding the directional sensing devices, the metamaterials and structures disclosed herein may be configured, in some embodiments, to provide an optoelectronic metamaterial sensor array which is capable of selectively capturing and processing electromagnetic radiation from any angle, and across at least the infrared and visible regions of the electromagnetic spectrum, and in some embodiments also including the ultraviolet region of the electromagnetic spectrum. Such sensor arrays may be used in a variety of applications, including but not limited to detection and navigation systems, video systems, and in laboratories for capturing and processing electromagnetic radiation emitted by or reflected off of animals or objects. The data captured by the directional sensor arrays may be processed by trained artificial intelligence or machine learning algorithms which have been trained to detect patterns in the data, for example to identify objects or terrain features in the images constructed from the captured data.

In some embodiments, dispersion devices utilizing the metamaterials disclosed herein are configured to disperse electromagnetic radiation that enters the dispersion devices in the infrared, visible and/or ultraviolet regions of the electromagnetic spectrum. Such dispersion devices may be applied, for example, to an aircraft or other vehicle, so as to disperse the electromagnetic radiation emitted from or reflected off of the vehicle, thereby obscuring the vehicle from view and evading detection by camera or other means. Such dispersion devices may additionally be applied to any object or feature that one desires to obscure from detection.

In an aspect of the present disclosure, a metamaterial absorption device comprises an optically transparent prism made of a wide range optically transparent material that transmits electromagnetic radiation in at least a visible region and an infrared region of an electromagnetic spectrum. The prism has a plurality of surfaces including a lens surface exposed to an electromagnetic source and a reflective surface adjacent to a reflective material. When an electromagnetic wave enters the device by passing through the lens surface of the prism, the electromagnetic wave is reflected by the reflective surface of the prism until the electromagnetic wave is absorbed by the device. In some embodiments, the prism's plurality of surfaces further includes an absorption surface adjacent an optically absorbent material, wherein the electromagnetic wave is absorbed when it hits the absorption surface of the prism. In some embodiments, the surfaces of the prism further includes a sensor surface adjacent to a sensing device. In such embodiments, when the electromagnetic wave passes through the sensor surface of the prism it is reflected off of the sensing device and when the electromagnetic wave hits the reflective surface it reflects off of the reflective material and passes back through the prism until an energy of the electromagnetic wave is fully dissipated by the device. The sensing device may include, but is not limited to, photodiodes, photoelectric cells, phototransistors, photoresistors.

In some embodiments of the absorption device, a second reflective surface is positioned spaced apart from the lens surface of the prism, wherein when the electromagnetic wave is reflected out of the prism through the lens surface, the electromagnetic wave is then reflected off of the second reflective surface and passes back into the prism through the lens surface. In some embodiments, the plane of the lens surface intersects with a plane of the second reflective surface. In other embodiments, the second reflective surface is covered by a layer of the wide range optically transparent material, such that the electromagnetic wave passes through and is refracted by the layer of the wide range optically transparent material before reflecting off of the second reflective surface. The prism may be an equilateral triangular prism, and wherein the lens surface is oriented at a 60° angle relative to the adjacent sensor surface and relative to the adjacent reflective surface. In other embodiments, the prism may be an isosceles triangular prism, wherein the lens surface is oriented at a 62° angle relative to the adjacent sensor surface and 56° relative to the adjacent reflective surface. In some embodiments, the absorption device further comprises an antenna for absorbing and transmitting electromagnetic radiation in the radio wave and microwave regions of the electromagnetic spectrum.

In another aspect of the present disclosure, an optoelectronic metamaterial directional sensor for selectively sensing electromagnetic radiation entering the sensor at a target angle of incidence is provided. The directional sensor comprises an optically transparent prism made of a wide range optically transparent material that transmits electromagnetic radiation in at least a visible region and an infrared region of an electromagnetic spectrum. The prism has a lens surface exposed to an electromagnetic radiation source, a sensor surface adjacent to at least one sensing device and an absorbent surface adjacent to an optically absorbent material. The sensor surface may be divided into a plurality of segments, wherein at least one segment of the plurality of segments corresponds to a target angle of incidence of an electromagnetic wave entering the prism through the lens surface. The at least one segment of the sensor surface is adjacent to at least one sensing device and the remaining segments of the plurality of segments of the sensor surface are adjacent to the said optically absorbent material. In some embodiments, each segment of the plurality of segments of the sensor surface has a corresponding sensing device, each corresponding sensing device having a corresponding target angle of incidence of the electromagnetic wave entering the lens surface of the prism. The optically absorbent material may include, but is not limited to, a carbon-based coating or a titanium-based coating.

In another aspect of the present disclosure, an optoelectronic metamaterial sensor array for selectively sensing electromagnetic radiation entering the sensor array at a target angle of incidence comprises a plurality of sensor modules, each sensor module comprising one or more directional sensors. Each sensor module of the plurality of sensor modules is configured to detect electromagnetic radiation from a selected band of the electromagnetic spectrum. The plurality of sensor modules are arranged to form the sensor array, and a processor or controller in electronic communication with each sensing device included in the plurality of sensor modules processes a plurality of signals received from the plurality of sensor modules to identify and process signals corresponding to at least one targeted angle of incidence of the said electromagnetic radiation from the selected band of the electromagnetic spectrum. The selected band of the electromagnetic spectrum is at least one band selected from a group comprising: a band of wavelengths in the visible region, a band of wavelengths in the infrared region, a band of wavelengths in the ultraviolet region. In some embodiments, the sensor module further comprises an antenna for absorbing and transmitting electromagnetic radiation in the radio wave and microwave regions of the electromagnetic spectrum. In some embodiments, a plurality of sensor modules is arranged in at least a north-south directional grouping and an east-west directional grouping so as to selectively detect electromagnetic radiation incident on the sensor array from both a north-south and an east-west azimuth directions. In some embodiments, a grid is formed of a plurality of sensor arrays, wherein the plurality of signals received from the plurality of sensor modules of the sensor array grid are identified and processed by the processor or controller so as to output to a display an image, the image representing the electromagnetic radiation detected by the plurality of sensor arrays of the grid in the selected band of the electromagnetic spectrum and the target angle of incidence.

In another aspect of the present disclosure, a metamaterial dispersion device comprises an optically transparent layer comprising an inner surface and an outer surface, wherein the inner surface is adjacent a reflective layer and the outer surface comprises a plurality of angular lenses. Each angular lens of the plurality of angular lenses forms an angle selected in a range between 0° and 180° relative to the reflective layer, and the optically transparent layer is comprised of a wide range optically transparent material that transmits electromagnetic radiation in at least a visible region an infrared region of an electromagnetic spectrum.

BRIEF DESCRIPTION OF THE DRAWINGS

FIGS. 7A and 7B are schematic illustrations of a metamaterial directional sensing array, in side elevation view.

FIGS. 8A and 8B are schematic illustrations of the metamaterial directional sensing array of FIGS. 7A and 7B, in top plan view.

DETAILED DESCRIPTION

Figures 1, 2:
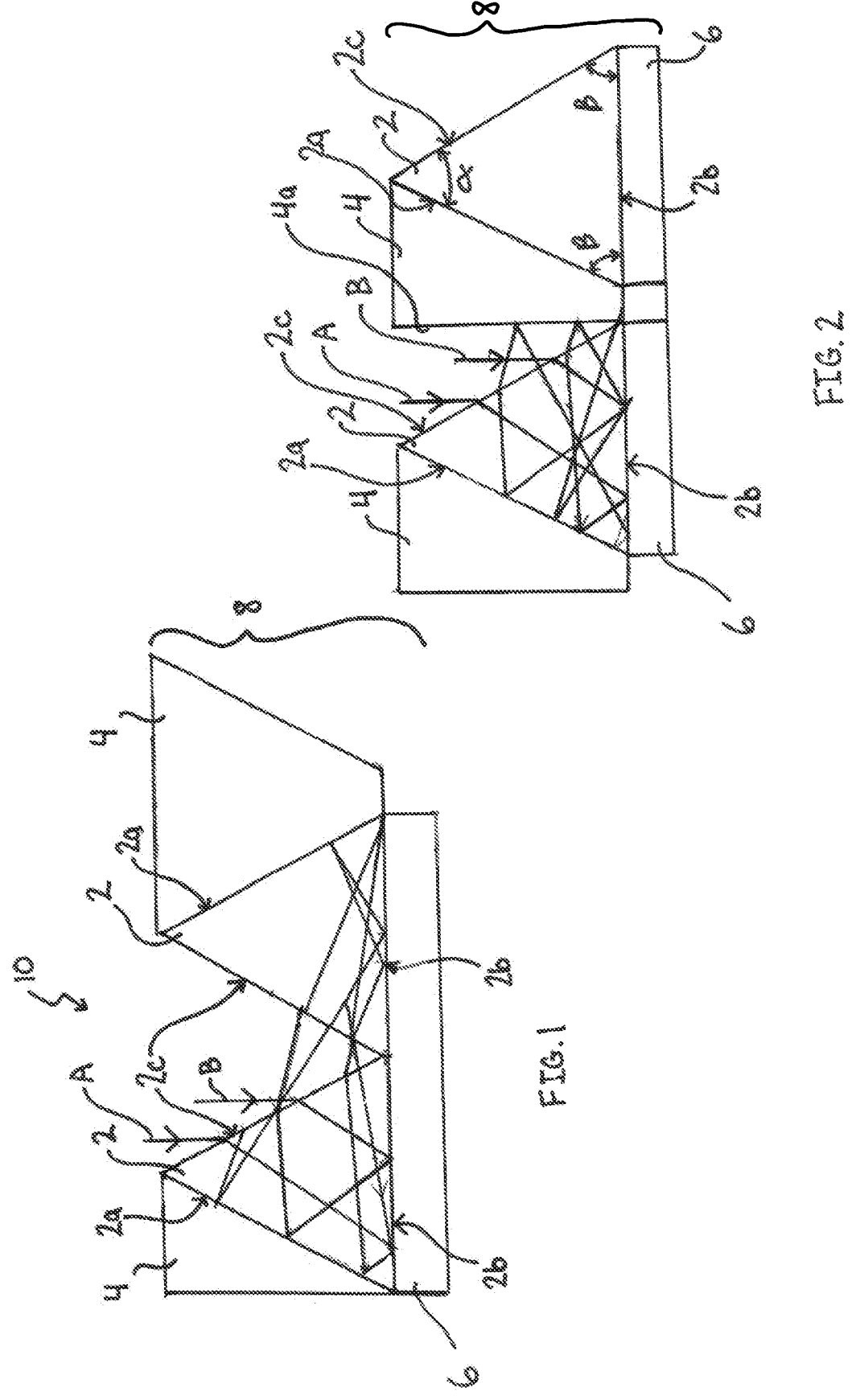
FIG. 1 is a front elevation view of an embodiment of a metamaterial optical absorption device.
FIG. 2 is a front elevation view of another embodiment of a metamaterial optical absorption device.

In an aspect of the present disclosure, the metamaterial devices disclosed herein incorporate a material that is optically transparent to, and thereby allows transmission of, electromagnetic radiation in at least a portion of the infrared region of the electromagnetic spectrum, as well as in the visible region of the electromagnetic spectrum. Some materials used in the construction of the metamaterial devices disclosed herein may also allow transmission of electromagnetic radiation in the ultraviolet region of the electromagnetic spectrum. Common optically transparent materials, such as glass, may allow transmission of visible light, but will block infrared and possibly also ultraviolet radiation. In contrast, advantageously, materials such as aluminum oxynitride optical ceramics allow transmission of visible, infrared and ultraviolet radiation. Other materials having similar optical properties that enable optical transmission of electromagnetic radiation in the infrared, visible and ultraviolet regions, or at least a portion of each of those regions, include spinel optical ceramics and sapphire. As used herein, the term "wide range optically transparent material" refers to optically transparent materials that allow high transmission (at least 80%) of electromagnetic radiation in at least a portion of the infrared and visible regions of the electromagnetic spectrum.

The metamaterial devices may include, in some aspects, a coating of the wide range optically transparent material which allows high transmission of electromagnetic radiation in at least the infrared and visible regions of the electromagnetic spectrum, and preferably also allows high transmission of electromagnetic radiation in the ultraviolet region of the electromagnetic spectrum. An upper surface of the wide range optically transparent coating or layer may be cut so as to produce an angular surface, the upper surface comprising one or more prisms having faces that are oriented at different angles relative to the lower surface of the layer. The angular faces of the one or more prisms, in different embodiments, may be adjacent to surfaces coated with an optically reflective material, an optically absorbent material, an optical sensing device, or any combination thereof. At least one face of the one or more prisms is not adjacent to another surface, but is instead exposed to a source of electromagnetic radiation, which enters the one or more prisms forming the layer. Depending on the configuration of the layer, specific exemplary embodiments of which are described in detail below, the electromagnetic radiation entering the layer may be absorbed or deflected, and in the embodiments incorporating sensing devices, the electromagnetic radiation may also be detected by the sensing devices.

Absorption

FIGS. 1 to 4 and 9 illustrate different embodiments of a metamaterial, comprising a wide range optically transparent layer, which metamaterial may be configured as an optical absorption device or an optical sensor. It will be appreciated by a person skilled in the art that the embodiments illustrated in FIGS. 1 to 4, each of which are front elevation views of different embodiments of metamaterials having wide range optically transparent layers and configured as absorption devices, show only one or two prisms having different prism faces that are adjacent various different surfaces, but that the embodiments themselves would include layers having a repeating pattern of that prism configuration so as to form a layer covering a surface. Examples of surfaces with the metamaterial coating may include, for example, a windshield, a lens or an aircraft cladding.

Referring to FIG. 1, an embodiment of a metamaterial optical absorption device comprises a wide range optically transparent layer 8 having optically transparent prisms 2, 2, the optically transparent prisms constructed of a wide range optically transparent material such as, but not limited to, aluminum oxynitride. The different faces of each prism 2 form an interface with another material or surface. For example, the interfaces 2a are between the wide range optically transparent material of the prism 2 and a reflective material 4, such as a reflective metal. The interfaces 2b are between the wide range optically transparent material of the prism 2 and a sensing device 6. The sensing device 6 may include, but is not limited to, photodiodes, photoelectric cells, phototransistors, photoresistors and like devices for sensing electromagnetic radiation, such as in the ultraviolet, visible and/or infrared regions of the electromagnetic spectrum. The interfaces 2c are between the wide range optically transparent material of the prism and any other medium which allows transmission of electromagnetic radiation from a source. Such media at interface 2c may include, but are not limited to, the atmosphere, water, and other gases or liquids. Typically, the interface 2c is with the atmosphere in contexts where the device 10 is utilized to detect objects emitting or reflecting electromagnetic radiation, for example in the air or on the land, although other applications may include, for example, detecting objects emitting or reflecting electromagnetic radiation underwater, in which case the medium at interface 2c would be water.

As shown in FIG. 1, rays of electromagnetic radiation A, B travel through a medium (which may be air, for example), and are incident on the medium-prism interface 2c of the prism 2. Each ray A, B reflects off the sensing device 6 at interfaces 2b a plurality of times, and also reflects off the reflective materials at interfaces 2a to be redirected towards the sensing device 6. It is therefore appreciated that, as a result of the angles of the prism 2 and the positioning of the reflective materials 4 and the sensing devices 6, each ray A, B is reflected within the layer 8 multiple times and hits the sensing device-prism interface 2b multiple times, thereby amplifying the signal detected by the sensing device 6 of each electromagnetic radiation ray A and B. The schematic diagram of FIG. 1, for clarity, does not show the entire path of each ray as they are reflected multiple times within the layer 8; however, the Applicant has determined the internal reflection within layer 8 occurs until the electromagnetic radiation is fully absorbed by the layer 8. Advantageously, if a rays A, B are of a low intensity so as to not be detectable by a conventional sensing device, the amplification of the signal produced by the ray due to the internal reflection within layer 8 may enable detection of such rays A, B. In some embodiments, the sensing device 6 shown in FIGS. 1 to 4 may be substituted with another reflective material 4, in which case the absorption device would be configured to merely absorb the electromagnetic radiation A, B without detecting a signal.

FIG. 2 shows another embodiment of a metamaterial optical absorption device 10, having a different configuration of the layer 8 as compared to the embodiment illustrated in FIG. 1. In FIG. 2, the layer 8 comprises a repeating pattern of prisms 2 having an interface 2a between a prism face and a reflective material 4, an opposing prism face having an interface 2c between the medium and the prism face, and another opposing prism face having an interface 2b between the prism face and a sensing device 6. As illustrated, electromagnetic radiation rays A, B pass into the prism at interface 2c between the medium and the prism face, and are reflected off of the reflective material 4 that is adjacent the prism face at interface 2a, and are also reflected off of an opposing face 4a of an opposing reflective material 4 when the rays A, B exit the prism 2 at the prism-medium interface 2c, such that the rays A, B re-enter the prism 2 at the prism-medium interface 2c. As with the illustration at FIG. 1, the schematic diagram of FIG. 2 does not show the entire path of each ray as it is reflected multiple times within the prism 2 of layer 8, but the Applicant has determined that internal reflection within layer 8 occurs until the electromagnetic radiation is absorbed by layer 8.

Figure 3:
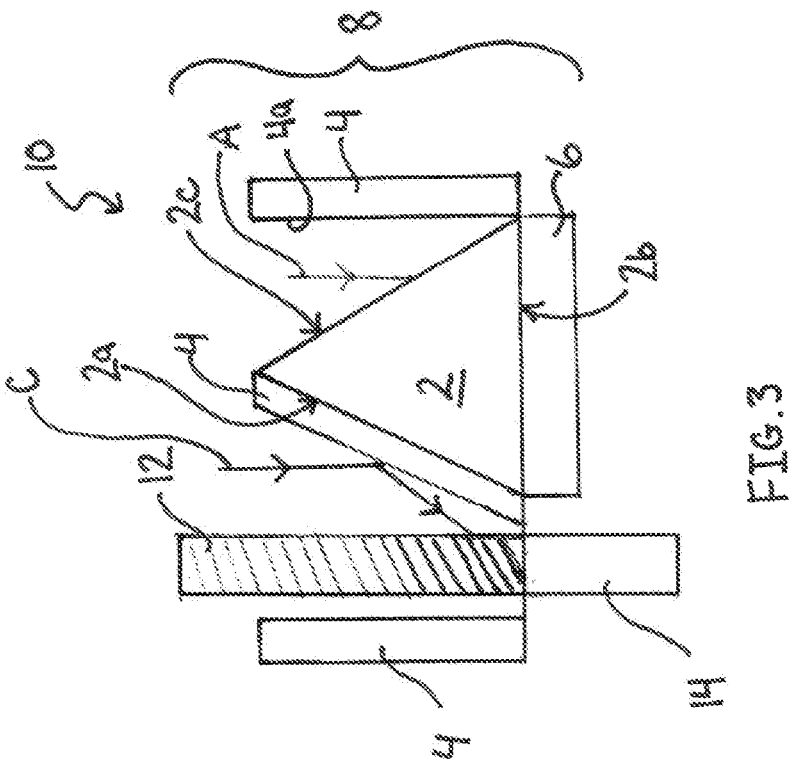
FIG. 3 is a front elevation view of another embodiment of a metamaterial optical absorption device.

FIG. 3 illustrates the incorporation of an antenna in another embodiment of the metamaterial optical absorption device 10. In the example shown in FIG. 3, the layer 8 incorporates an antenna, such as in the form of a metallic rod 12, for receiving electromagnetic radiation in the radio and microwave regions of the electromagnetic spectrum. The rod 12 may be in communication with a receiver 14 for receiving the radio and microwaves. The rod 12 may be adjacent a reflective material 4 on either side of the rod 12 within layer 8, so as to amplify the signal of a radio or microwave ray C and thereby concentrate the signal of the electromagnetic radiation in the radio and microwave regions of the electromagnetic spectrum. Similar to other embodiments, the layer 8 also includes a prism of the wide range optically transparent material, which in this configuration of the layer 8, includes a prism face adjacent to a reflective material 4 at interface 2a, an opposing prism face adjacent to a medium to form a medium-prism interface 2c, and another opposing prism face adjacent to the sensing device 6 at interface 2b. Although not shown in FIG. 3, similar to the embodiments shown at FIGS. 1 and 2, a ray A of electromagnetic radiation in the visible, infrared or ultraviolet regions of the electromagnetic spectrum would enter the prism through interface 2c and be reflected many times against the reflective materials 4, 4 so as to amplify the signal of the ray A sensed by the sensing device 6. In this manner, layer 8 would be capable of sensing or detecting electromagnetic radiation within the ultraviolet, visible and/or infrared regions of the electromagnetic spectrum, as well as in the radio and/or microwave regions of the electromagnetic spectrum.

Figure 4:
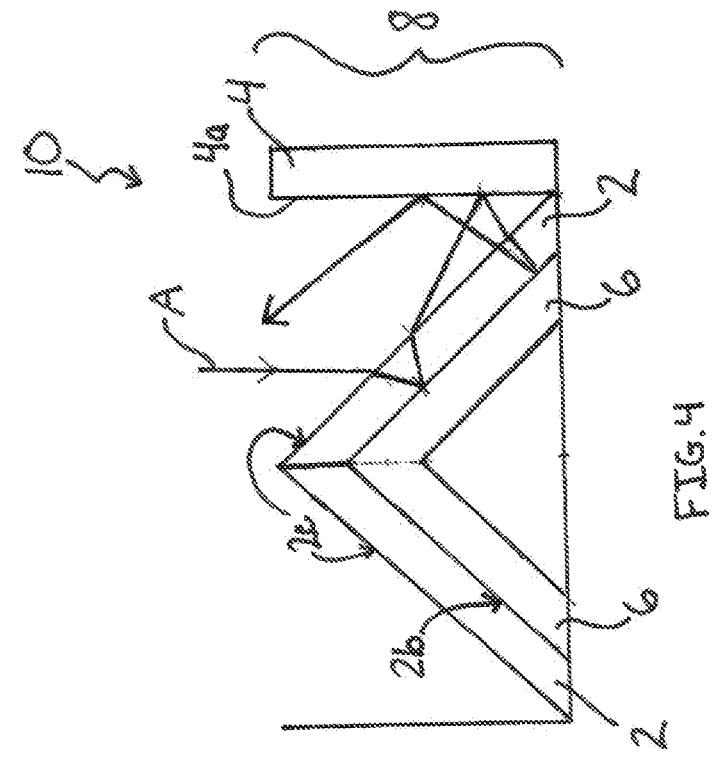
FIG. 4 is a front elevation view of another embodiment of a metamaterial optical absorption device.

FIG. 4 shows another embodiment of the metamaterial optical absorption device 10. Whereas each of the embodiments illustrated in FIGS. 1 to 3 include a layer 8 comprising a repeating pattern of triangular prisms 2, the layer 8 of FIG. 4 includes a trapezoidal prism 2 overlaying a sensor 6 to form interface 2b, with an opposite and parallel prism face of prism 2 forming a medium-prism interface 2c which is exposed to a source of electromagnetic radiation. A ray of electromagnetic radiation A enters the prism 2 and is reflected off the sensing device 6, and may be reflected out of the prism 2 at interface 2c. The ray A then reflects off of a proximate reflective surface 4 and is reflected back into the prism 2 at interface 2c, so as to once again enter the sensing device 6. Thus, the configuration of the device 10, shown in FIG. 4, may amplify the signal of the electromagnetic radiation ray A without necessarily absorbing the electromagnetic radiation.

Without intending to be limiting, in one aspect of the present disclosure the size and scale of the absorption devices illustrated in FIGS. 1 to 4 may be in the range of the wavelengths of electromagnetic radiation to be absorbed by the absorption devices. For example, a height of the layer 8 shown in FIGS. 1 to 4 may be in the range of approximately 10 nanometers (nm) to 10 micrometers (μm), depending on whether the absorption device is configured to absorb electromagnetic radiation in the ultraviolet, visible or infrared regions of the electromagnetic spectrum. As mentioned, the device may be configured as a layer or a coating that is applied to cover a surface, or a portion thereof, in which case each of the devices illustrated in FIGS. 1 to 4 represent one unit, and a plurality of these units would be repeated in a pattern positioned side-by-side so as to cover the surface with the absorption coating.

It will be appreciated that, although the triangular prisms 2 shown in FIGS. 1 to 3 may each be isosceles triangular prisms, having one angle α equal to 56° and two angles 13 that are each equal to 62°, with the angle α oriented upwardly towards the source of electromagnetic radiation, the present disclosure is not limited to layers including prisms 2 having these angles. Other configurations of triangular prisms may also be included in other embodiments of the layer 8 of the metamaterial device 10 which will, in combination with forming interfaces 2a and/or 4a with reflective materials 4, accomplish at least some amplification of an electromagnetic signal sensed by a sensing device 6 and/or absorption of the electromagnetic radiation within the device 10, and are intended to be included in the scope of the present disclosure. Other factors that will influence the design of the prisms 2 included in the layer 8 include, but are not limited to, the wide range optically transparent material used to form the prisms 2 and the index of refraction of that material for a target wavelength, or range of wavelengths of the electromagnetic radiation to be absorbed and/or sensed by the device 10. The examples of different embodiments of the device 10, shown in FIGS. 1 to 4, are provided as examples of how the device 10 may be configured and are not intended to be limiting.

Dispersion

Figure 9:
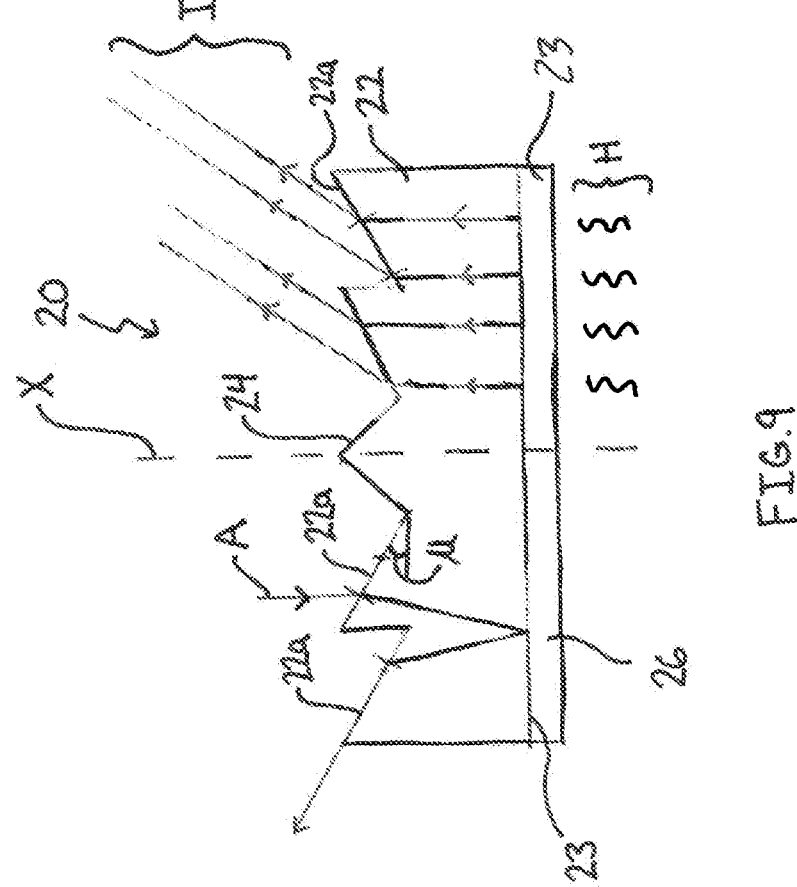
FIG. 9 is a front elevation view of an embodiment of a metamaterial optical dispersion device.

Referring to FIG. 9, which illustrates an example embodiment of a dispersion device 20 of the present disclosure, the device 20 includes a layer 22 of a wide range optically transparent material as described above, which may include for example an aluminum oxide optical ceramic, sapphire or spinel. The layer 22 comprises an inner surface 23, the inner surface being adjacent a reflective layer 26, and an outer surface 24. The reflective layer 26 may be formed of a reflective coating or substance which reflects electromagnetic radiation, and may be made of a polished metal, which may include but is not limited to gold, silver or platinum.

The outer surface 24 of optically transparent layer 22 may be cut at angles in a symmetrical pattern, starting at a center line X and moving outwardly from the center line X so as to create a plurality of angled lenses 22a that are partially oriented or angled towards the center line X, similar to how a Fresnel lens is formed.

For illustrative purposes, the schematic drawing of an embodiment of a dispersion device 20 shows an example of electromagnetic radiation ray A entering the optically transparent layer 22 from the outer surface 24 on the left hand side of center line X, while the right hand side of center line X shows an example of infrared radiation H radiating from an object beneath and adjacent the reflective layer 26, the infrared radiation H transmitting through the reflective layer 26 and then passing through the inner surface 23 of the optically transparent layer 22. However, it will be appreciated that this layout of the schematic illustration of FIG. 9 is meant for illustrative purposes to clearly show the direction of travel of different types of electromagnetic radiation transmitting through the dispersion device 20, and that in practice, the infrared radiation H and the visible or ultraviolet radiation represented by rays A would both pass through different sections of the device 20. It will also be appreciated that, similar to the different embodiments of optical absorption devices illustrated in FIGS. 1 to 4, the dispersion device illustrated in FIG. 9 is a single unit that would be repeated in a pattern across an entire surface; for example, not intended to be limiting, the dispersion device may be deployed in the form of a coating that covers the entire outer surface of a vehicle or aircraft, or a portion thereof.

As shown on the left side of center line X in FIG. 9, electromagnetic radiation, for example in the infrared, visible and/or ultraviolet regions of the electromagnetic spectrum, as represented by ray A, enters the optically transparent layer 22 of the dispersion device 20 from the outer surface 24 and is refracted so as to travel towards the reflective layer 26. At the interface between the inner surface 23 and the reflective layer 26, the ray A is reflected off of the reflective layer 26 and redirected towards the outer surface 24, where the ray A is again refracted as it reaches the interface between the outer surface 24 and the medium surrounding the device 20, which medium may be air for example. The combination of the angle μ chosen for the angled lenses 22a relative to the inner surface 23, and the wide range optically transparent material chosen for the optically transparent layer 22, results in scattering the electromagnetic radiation A that enters the device 20 into a direction away from where the radiation A initially entered the device 20, and in a direction away from center line X. Advantageously, rather than allowing electromagnetic radiation in the infrared, ultraviolet or visible regions of the electromagnetic spectrum to reflect off of a surface so as to be detected by a sensor or camera, the electromagnetic radiation is dispersed away from the original source of that electromagnetic radiation, with the result that the surface of an object covered by the dispersion device becomes more difficult to identify or detect.

Additionally, if the object that is covered by the dispersion device 20 emits heat, the resulting infrared radiation H transmits through the reflective layer 23, which may be constructed of a thermally conductive material such as a metal. The infrared radiation, represented in FIG. 9 by rays I, may then transmit through the optically transparent layer 22 and will be refracted as they cross the interface between the outer surface 24 of optically transparent layer 22 and the surrounding medium, which may be air (for example). As shown on the right hand side of center line X in FIG. 9, the combination of the angle μ chosen for the formation of lenses 22a and the refractive index of the wide range optically transparent material comprising the layer 22 results in the infrared radiation I being scattered away from the dispersion device 20 and away from the center line X. Again, such dispersion of infrared radiation away from the surface of the object covered by a dispersion device 20 may obscure the object from detection by an infrared camera or other infrared sensors.

Without intending to be limiting, in one aspect of the present disclosure the size and scale of the dispersion device embodiment illustrated in FIG. 9 may be in the range of millimeters (mm). For example, not intended to be limiting, a height of the layer 22 shown in FIG. 9 may be in the range of approximately 1 to 100 mm.

Directional Sensing

Optoelectronic sensors, constructed of the metamaterials described herein, may be designed for selectively sensing electromagnetic radiation entering the sensor at a targeted angle of incidence. A plurality of such sensors may be constructed wherein the lens of each sensor is at a different angle relative to the surface on which the sensor is mounted. Advantageously, forming an array of such plurality of sensors, in a grid pattern, may provide an optoelectronic sensor array that is capable of selectively sensing electromagnetic radiation in a selected range of the electromagnetic spectrum at a selected angle of incidence, which may eliminate the need for mounting navigational sensors to a gimbal for detection of infrared, visible or ultraviolet radiation in an aircraft. In other applications, an optoelectronic sensor array may be mounted to or coated onto a flat or curved surface, enabling the capture of images or video from any direction or angle, relative to the flat or curved surface. Such an array may eliminate the need for mounting cameras or sensors in gimbals or motorized mounts for moving the lens of a traditional camera or sensor to point at the electromagnetic radiation source of interest.

Figure 5:
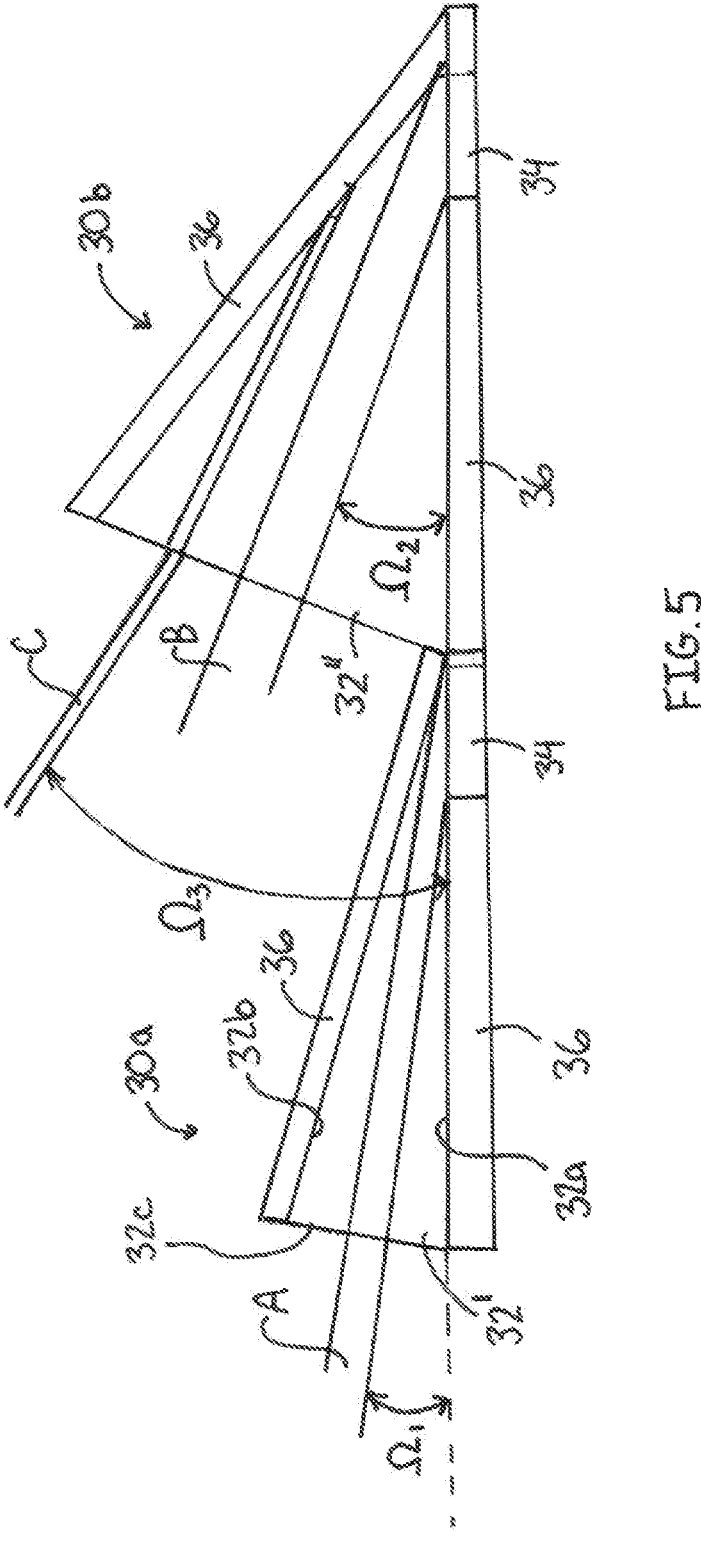
FIG. 5 is a side elevation view of an embodiment of a metamaterial directional sensing device.

In some embodiments of an optoelectronic metamaterial directional sensor 30a, 30b, illustrated in FIG. 5, a triangular prism of a wide rage optically transparent material 32 is adjacent, on a sensor surface 32a of the prism 32, to a sensing device 34, with the remainder of the sensor surface 32a adjacent to an optically absorbent material 36. The optically absorbent material may include, for example, a carbon-based or a titanium-based coating, or any other material that is efficient at absorbing electromagnetic radiation. An example of such material, not intended to be limiting, is sold under the trademark Vantablack™ by Surrey Nanosystems. An absorbent surface 32b of the prism 32 is also adjacent an optically absorbent material 36. The lens surface 32c of the triangular prism 32 is exposed to a source of electromagnetic radiation, represented in FIG. 5 as ray A.

In the embodiment illustrated in FIG. 5, sensor 30a is configured such that electromagnetic radiation A, entering the prism 32' with an angle of incidence that is normal to the lens surface 32c, such that an angle $\Omega_1$ formed between the radiation A and the sensor surface 32a of the prism 32a is equal to 8°, the electromagnetic radiation A reaches the sensing device 34. Whereas, electromagnetic radiation having a non-zero angle of incidence on the lens surface 32c will not reach the sensing device 34, and will instead be absorbed by the absorbent material 36. This may be viewed in the configuration of prism 32", whereby ray B has an angle of incidence that is normal to the lens surface 32c of prism 32 and an angle $\Omega_2$ equal to 20°, and therefore the ray B reaches the sensing device 34. In contrast, ray C does not have an angle of incidence that is normal to the lens surface 32c of prism 32" and angle $\Omega_3$ is greater than 20°, and therefore the ray C is diffracted towards the absorbent material 36 when it enters the prism through lens surface 32c and does not hit the sensing device 34. Thus, it may be appreciated that sensor 30a is configured to selectively sense electromagnetic radiation that enters the lens 32c at an angle $\Omega_1$ of 8°, and sensor 30b is configured to selectively sense electromagnetic radiation that enters the lens 32c at an angle $\Omega_2$ of 20°. As described elsewhere in this disclosure, the sensing devices 34 may include, but are not limited to, photodiodes, photoelectric cells, phototransistors and photoresistors. The wide range optically transparent materials for construction of the prisms 32 may include, but are not limited to, aluminum oxynitride optical ceramics, sapphire, spinel, and other suitable materials that allow optical transmission of electromagnetic radiation in the infrared, visible and/or ultraviolet regions of the electromagnetic spectrum.

Figures 6A, 6B:
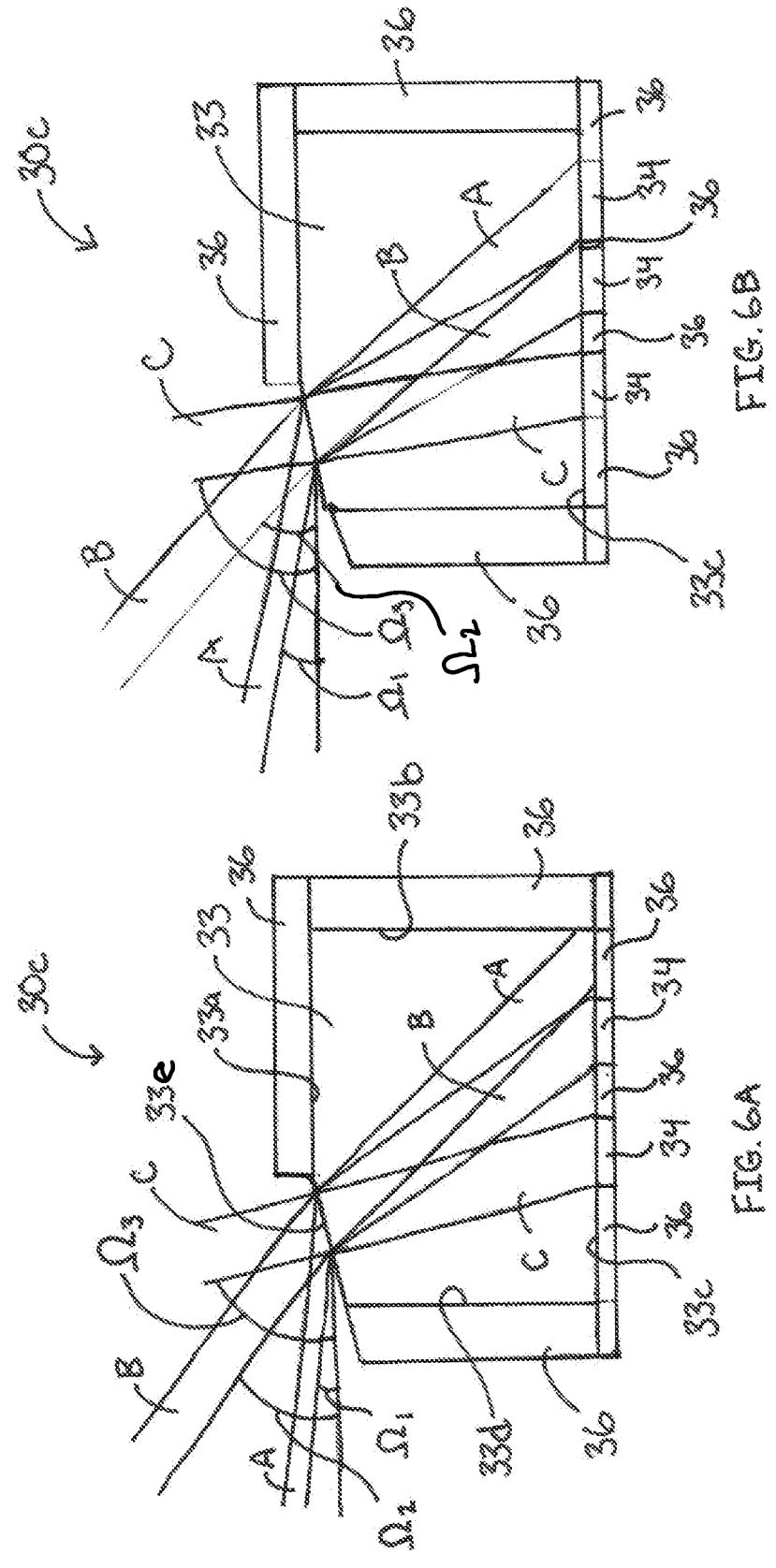
FIGS. 6A and 6B are side elevation views of another embodiment of a metamaterial directional sensing device.

Other embodiments of optoelectronic metamaterial directional sensors 30c are shown in FIGS. 6A and 6B. In these embodiments, a prism 33 has five sides, with sides 33a, 33b and 33d being adjacent an optically absorbent material 36. Side 33c of prism 33 is adjacent two separate optical sensing devices 34, 34, which sensing devices are separated by optically absorbent material 36, and the remainder of side 33c is also adjacent optically absorbent material 36 surrounding the sensing devices 34. Side 33e of prism 33 is exposed to a source of electromagnetic radiation and forms the lens of the prism. Rays of electromagnetic radiation A, B and C enter the prism 33 through lens surface 33e at different angles of incidence, and form angles $\Omega_1$, $\Omega_2$ and $\Omega_3$ to the horizontal. Depending on the refractive index of the wide range optically transparent material of the prism 33, the rays A, B and C will refract in different directions when entering prism 33 through the lens surface 33e, and as a result, the rays A, B and C will hit different sections of the sensor surface 33c of the prism 33. Therefore, depending on the angle $\Omega$ at which the electromagnetic radiation enters the prism through lens 33e, the electromagnetic radiation may hit a sensing device 34 or it may be absorbed by the optically absorbent material 36. Depending on the positioning of the sensing devices 34 and the angle of the lens 33e, the sensor 30c may therefore be configured to detect electromagnetic radiation entering prism 33 at particular, selected angles $\Omega$. By way of illustration only, not intended to be limiting, ray A enters prism 33 at angle $\Omega_1$ equal to 6°, ray B enters prism 33 at angle $\Omega_2$ equal to 38°, and ray C enters prism 33 at angle $\Omega_3$ equal to 80°. Due to the positioning of sensing devices 34, 34 adjacent to prism surface 33c, and the refractive index of the material of prism 33, rays B and C will be detected by one of the sensing devices 34, 34 while ray A will be absorbed by the absorbent material 36 and thereby not detected by the sensing device 30c. In another illustrative example of a sensor 30c shown in FIG. 6B, there are three sensing devices 34 arranged to be adjacent the prism surface 33c, each sensing device 34 separated by an optically absorbent material 36. In this example, ray A enters prism 33 at angle $\Omega_1$ equal to 11°, ray B enters prism 33 at angle $\Omega_2$ equal to 42°, and ray C enters prism 33 at angle $\Omega_3$ equal to 83°, and all three rays are detected by sensing devices 34, though it may be appreciated that other rays entering at different angles $\Omega$ may be refracted so as to be absorbed by an absorbent material 36.

It will be appreciated, with respect to the illustrative examples of the directional sensors 30a, 30b and 30c, that other modifications not illustrated herein are also possible for the selective sensing of electromagnetic radiation from different directions, and such modifications are intended to be included in the scope of the present disclosure. For example, the geometry of the prisms 32 or 33 may be other than three-sided or five-sided prisms, the sensing devices 34 may be arranged to be adjacent to different sides of the prism, and each directional sensor may be configured to have only one, or more than two or three, sensing devices.

In some embodiments, a single sensor 30c may be configured to selectively detect electromagnetic radiation from many different angles $\Omega$.

Any of the embodiments of a directional sensor, including but not limited to the directional sensors 30a, 30b and/or 30c, may be configured in a sensing array, as illustrated in the schematic drawings of FIGS. 7A, 7B, 8A and 8B.

As shown in FIG. 7A, a sensor array module 40 comprises a plurality of directional sensors 30. Each of the directional sensors 30 in sensor array module 40 may be configured to sense electromagnetic radiation from a selected angle, such as the example embodiments 30a, 30b shown in FIG. 5. For example, the module 40 shown in FIG. 7A comprises seven directional sensors 30, each sensor configured to detect electromagnetic radiation entering the sensor 30 at an angle $\Omega$ of 10°, 20°, 40°, 90°, 140°, 160° or 170°, respectively. However, a module 40 may include more or fewer than seven directional sensors 30, and furthermore, a module 40 may instead, or also, comprise of one or more directional sensors 30 that are configured to selectively sense electromagnetic radiation entering the sensor 30 at two or more angles $\Omega$, such as the sensors 30c illustrated in FIGS. 6A and 6B.

In an alternative configuration, shown in FIG. 7B, a module 40 may comprise a plurality of sensors 30 configured to sense electromagnetic radiation at a selected angle $\Omega$ relative to the horizontal, such as 40°, but each sensor 30 may be configured to sense radiation of different wavelengths; for example, the four directional sensors 30 may each be configured to sense electromagnetic radiation from different regions of the visible light spectrum, such as red, orange, green and violet.

In FIG. 8A, which is a top plan view of an array 50a of sensor modules 40, the array may be configured to detect electromagnetic radiation, from zero to 180° in the west-east azimuth direction, while the array 50b may be configured to detect electromagnetic radiation, from zero to 180° in the north-south azimuth direction. Other arrays 50 may be configured to detect electromagnetic radiation in other azimuth directions, such as from northwest-southeast or northeast-southwest azimuth directions. Additionally, different rows 40a to 40e may be each configured to selectively detect radiation from different regions of the electromagnetic spectrum; for example, row 40a may be configured to detect ultraviolet radiation, row 40b may be configured to detect visible radiation and row 40c may be configured to detect infrared radiation. In other configurations, the rows 40a to 40e may be configured to each detect only one specific wavelength, thus selectively detecting different wavelengths in the visible spectrum for example. It will be appreciated that each array may include more or less than five rows of sensor modules 40.

A plurality of arrays 50a, 50b, for example, tens or hundreds of thousands of arrays 50a, 50b, may be arranged in a grid pattern to cover a surface, to create a grid of arrays for selectively detecting only selected wavelengths of electromagnetic radiation at only selected azimuth directions at any selected angle. Each array 50a or 50b may form a unit cell in the grid of arrays, similar to an LED display which is formed of a grid of light-emitting diodes which constitute the pixels of the display. Each array 50a, 50b in the grid is in electronic communication with a controller or a processor, so that the signals generated in the sensing devices in each array, by electromagnetic radiation of a selected wavelength or range (for example, in the infrared or visible regions of the electromagnetic spectrum), and from a selected azimuth angle (for example, at 80° in the north-south direction) may be selected by a user for identification and processing into an image. In other words, if a user desires to view an image in the infrared range of the electromagnetic spectrum taken at 80°, the user would instruct the controller or processor to obtain all of the data collected by the directional sensors in each array that is configured to sense electromagnetic radiation at 80°, and process the signals and data obtained by each of those identified directional sensors into an image that corresponds to a representation of the grid of arrays. In this manner, grids of directional sensing arrays may be created for capturing still images or video of visible, infrared and/or ultraviolet radiation, in any direction from zero to 180° relative to the plane on which the grid of arrays has been applied.

What is claimed is:

1. An optoelectronic metamaterial directional sensor for selectively sensing electromagnetic radiation entering the sensor at a target angle of incidence, the directional sensor comprising:

an optically transparent prism, the optically transparent prism comprising a wide range optically transparent material that transmits electromagnetic radiation in at least a visible region and an infrared region of an electromagnetic spectrum, the prism further comprising a lens surface exposed to an electromagnetic radiation source, a sensor surface adjacent to at least one sensing device and an absorbent surface adjacent to an optically absorbent material, the sensor surface divided into a plurality of segments, wherein at least one segment of the plurality of segments corresponds to a target angle of incidence of an electromagnetic wave entering the prism through the lens surface, wherein the at least one segment of the sensor surface is abutting the at least one sensing device and the remaining segments of the plurality of segments of the sensor surface are abutting the said optically absorbent material.

2. The directional sensor of claim 1, wherein each segment of the at least one segment of the sensor surface has a corresponding sensing device, each corresponding sensing device having a corresponding target angle of incidence of the electromagnetic wave entering the lens surface of the prism.

3. The directional sensor of claim 1, wherein the optically absorbent material is selected from a group comprising: a carbon-based coating, a titanium-based coating.

4. The directional sensor of claim 1, wherein the wide range optically transparent material is selected from a group comprising: aluminum oxynitride, sapphire, spinel.

5. The directional sensor of claim 1, wherein the at least one sensing device is selected from a group comprising: photodiodes, photoelectric cells, phototransistors, photoresistors.

6. An optoelectronic metamaterial sensor array for selectively sensing electromagnetic radiation entering the sensor array at a target angle of incidence, the sensor array comprising:

a plurality of sensor modules, each sensor module of the plurality of sensor modules comprising one or more directional sensors of claim 1, wherein each sensor module is configured to detect electromagnetic radiation from a selected band of the electromagnetic spectrum, the plurality of sensor modules arranged to form the sensor array, wherein a processor or controller in electronic communication with each sensing device included in the plurality of sensor modules processes a plurality of signals received from the plurality of sensor modules to identify and process signals corresponding to at least one targeted angle of incidence of the said electromagnetic radiation from the selected band of the electromagnetic spectrum.

7. The sensor array of claim 6, wherein the selected band of the electromagnetic spectrum is at least one band selected from a group comprising: a band of wavelengths in the visible region, a band of wavelengths in the infrared region, a band of wavelengths in the ultraviolet region.

8. The sensor array of claim 6, wherein each sensor module further comprises an antenna for absorbing and transmitting electromagnetic radiation in a radio wave and a microwave regions of the electromagnetic spectrum.

9. The sensor array of claim 6, wherein the plurality of sensor modules is arranged in at least a north-south directional grouping and an east-west directional grouping so as to selectively detect electromagnetic radiation incident on the sensor array from both a north-south and an east-west azimuth directions.

10. The sensor array of claim 9, wherein the plurality of sensor modules is supported on a contoured surface or a planar surface.

11. A grid formed of a plurality of sensor arrays of claim 6, wherein the plurality of signals received from the plurality of sensor modules of the sensor array grid are identified and processed by the processor or controller so as to output an image to a display, the image representing the electromagnetic radiation detected by the plurality of sensor arrays of the grid in the selected band of the electromagnetic spectrum and the target angle of incidence.

12. The sensor array of claim 6, wherein the wide range optically transparent material is selected from a group comprising: aluminum oxynitride, sapphire, spinel.

13. The sensor array of claim 6, wherein the at least one sensing device is selected from the group comprising: photodiodes, photoelectric cells, phototransistors, photoresistors.

14. The sensor array of claim 6, wherein the optically absorbent material is selected from a group comprising: a carbon-based coating, a titanium-based coating.

* * * * *